United States Patent [19]

Hamamoto

[11] Patent Number: 5,261,000
[45] Date of Patent: Nov. 9, 1993

[54] ON-LINE TERMINAL UNIT
[75] Inventor: Kazutomo Hamamoto, Sagamihara, Japan
[73] Assignee: Matsushita Electric Industrial Co., Ltd., Osaka, Japan
[21] Appl. No.: 819,860
[22] Filed: Jan. 13, 1992
[30] Foreign Application Priority Data
  Jan. 23, 1991 [JP] Japan .................. 3-006197
[51] Int. Cl.⁵ ............................. H04L 9/32
[52] U.S. Cl. ......................... 380/23; 380/24
[58] Field of Search ................... 380/23, 24
[56] References Cited

U.S. PATENT DOCUMENTS

| 4,679,236 | 7/1987 | Davies | 380/23 |
| 4,694,492 | 9/1987 | Wirstrom et al. | 380/23 |
| 4,819,267 | 4/1989 | Cargile et al. | 380/23 |
| 4,964,163 | 10/1990 | Berry | 380/23 |
| 5,060,263 | 10/1991 | Bosen et al. | 380/23 X |

FOREIGN PATENT DOCUMENTS 64-79858 3/1989 Japan .
1-131987 5/1989 Japan .
1-217675 8/1989 Japan .

*Primary Examiner*—Gilberto Barrón, Jr.
*Attorney, Agent, or Firm*—Stevens, Davis, Miller & Mosher

[57] ABSTRACT

A high-security on-line terminal unit comprises means of automatically generating a password of m+n digits formed of an m-digit number determined based on the date of data creation and an n-digit number determined based on the print number of output data, means of entering from outside a password of m+n digits determined through reference to external password forming tables based on the date of data creation and data print number printed on a delivered slip, and means of comparing the two passwords and enabling data transmission only if both passwords coincide with each other.

5 Claims, 3 Drawing Sheets

FIG. 2

```
                                                            ┌─ 7 SLIP
                                                           ┤
                                                            └ 8 DATA CREATION
                                                                 DATE
┌─────────────────────────────────────────────────────────────────────────┐
│           ** XXXX SERVICE **                                            │
│                    DATE AND TIME OF LISTING : │SEPT. 6,│ 1989 12:11     │
│ [CITY/TOWN/VILLAGE TAX PAYMENT DATA]                                    │
│ FINANCIAL ACCOUNT : PRE-REGISTERED ACCOUNT NUMBER : 10                  │
│ BANK:0009, BANK NAME:XXXX, BRANCH CODE:123, BRANCH NAME:AOYAMA          │
│ CLASS:CHECK ACCOUNT, ACCOUNT NUMBER:123456,                             │
│ ACCOUNT NAME : MARUMAN CORP.                                            │
│ ADDRESS                                                                 │
│ (PAYMENT INFORMATION)                                                   │
│ ┌────┬──────────┬────────────────┬───────┬──────────┬──────────────┐    │
│ │ No │CITY/TOWN │SPECIFIED NUMBER│ALTERA-│NUMBER OF │ SALARY TAX   │    │
│ │    │VILLAGE   │                │ TION  │ITEMS OF  │              │    │
│ │    │CODE      │                │       │ SALARY   │              │    │
│ ├────┼──────────┼────────────────┼───────┼──────────┼──────────────┤    │
│ │ 1  │ 123444   │ ABF111113B45668│   0   │    23    │   82,310     │    │
│ └────┴──────────┴────────────────┴───────┴──────────┴──────────────┘    │
│     .                                                                   │
│     .                                                                   │
│     .                                                                   │
│     .                                                                   │
│ ┌────┬──────────┬────────────────┬───────┬──────────┬──────────────┐    │
│ │ 13 │ 123456   │ A1234576B111111│   1   │   100    │  620,000     │    │
│ ├────┴──────────┴──┬─────────────┴──┬────┴──────────┴──────────────┤    │
│ │ │No.513│ TOTAL NUMBER OF :  240  │ TOTAL AMOUNT OF : 3,200,000 YEN│   │
│ │        │ ITEMS OF SALARY         │ SALARY TAX                    │    │
│ ├──────────────────────────────────┴───────────────────────────────┤    │
│ │ LIMIT OF DATE.OF PAYMENT:SEPT.10,1989  MONTH OF PAYMENT : AUG. 1989│   │
│ └──────────────────────────────────────────────────────────────────┘    │
│                                                      *** END OF PRINT ***│
└─────────────────────────────────────────────────────────────────────────┘
    9
  PRINT
  NUMBER
```

ON-LINE TERMINAL UNIT

BACKGROUND OF THE INVENTION

This invention relates to an on-line terminal unit used for firm banking and the like. Firm banking is a service of a bank based on an on-line computer system in which a computer of the bank is connected to computers of firms through a communication line, thereby having various transactions with the firms and offering information to the firms.

Conventional on-line terminal units intended for this purpose are generally equipped with a security function which makes the unit operative in response to the entry of a secret number which is known only by a legitimate user. However, this conventional security function involves such problems that if the secret number is leaked to another person, the terminal unit can illegally be operated by that person, or if the legitimate user forgets the secret number, the user cannot operate the terminal unit.

Another conventional security function, as described in Japanese Patent Unexamined Publication No. 1-217675, is designed to record and update the date and time of line disconnection in the customer's record in the customer files stored in the terminal unit and in the central computer at each information access event made through the terminal unit, thereby protecting the account transaction information from being accessed by other person through a terminal unit. However, this preventive function for firm banking against erroneous terminal connection is solely intended to prevent illegal information access from terminal units other than authorized terminal units, and it cannot prevent an illegal information access through an authorized terminal unit.

SUMMARY OF THE INVENTION

This invention is intended to overcome the foregoing prior art deficiency, and its prime object is to provide an on-line terminal unit equipped with a superior security function which enables a legitimate user to have information access by merely remembering a simple rule of operation which cannot easily be analyzed by other person.

In order to achieve the above objective, the inventive on-line terminal unit comprises means of automatically generating a password formed of an m-digit number determined based on the date of data creation and an n-digit number determined based on the print number of output data, means of entering an m+n digit password which is determined through reference to an external password table based on the date of data creation and print number, and means of comparing these two passwords and enabling data transmission only if both passwords coincide with each other.

Accordingly, the inventive on-line terminal unit can be operated by a legitimate user who merely needs to remember a simple rule of operation instead of having a risk of forgetting the password, and it is tightly secure against the leakage of password to other person.

BRIEF DESCRIPTION OF THE DRAWINGS

FIG. 2 is a diagram showing an output slip delivered by the inventive terminal unit;

DESCRIPTION OF THE PREFERRED EMBODIMENT

Figure 1:
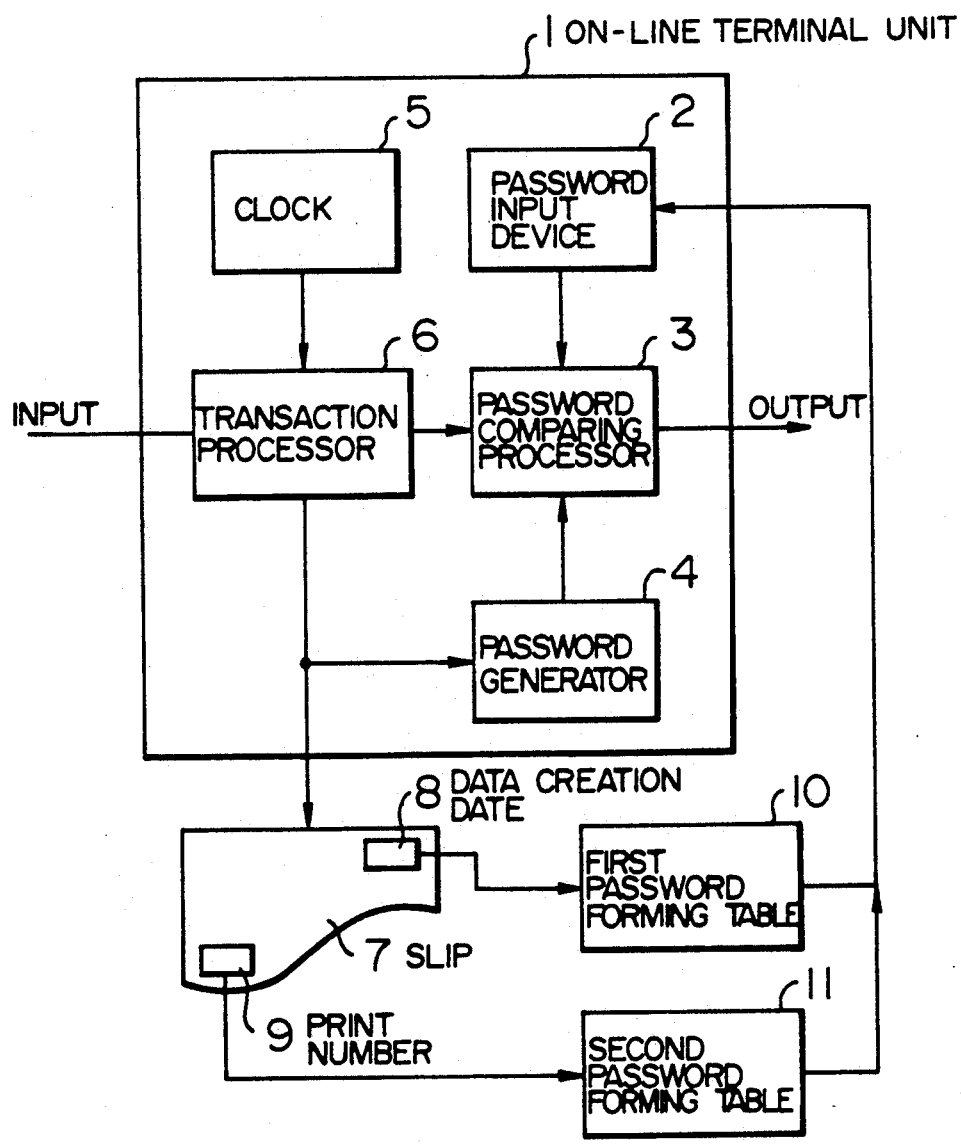
FIG. 1 is a block diagram showing the principal portions of the on-line terminal unit based on an embodiment of this invention.

FIG. 1 shows the arrangement of an embodiment of this invention. In the figure, indicated by 1 is an on-line terminal unit, 2 is a password input device, 3 is a password comparing processor, 4 is a password generator, 5 is a clock, and 6 is a transaction processor. Indicated by 7 is a slip delivered by the on-line terminal unit 1, with an item 8 of data creation date and item 9 of print number being printed thereon. Indicated by 10 is a first password forming table prepared in advance based on a table of random numbers for generating an m-digit (e.g., 4-digit) number in one-to-one correspondence to the data creation date 8 of the slip 7, and 11 is a similar second password forming table for generating an n-digit (e.g., 2-digit) number in one-to-one correspondence to the print number 9 of the slip 7.

Next, the operation of the above arrangement will be explained. In response to an input access to the on-line terminal unit 1 over a communication line, the transaction processor 6 implements the predetermined data processing and issues a slip 7. Items printed on the slip 7 include the data creation date 8 based on the clock 5 and the print number 9 based on the count in the transaction processor 6.

When the user intends to transfer the printed data of the slip 7 to other terminal units in on-line linkage, the user reads a 4-digit number out of the first password forming table 10 based on the data creation date 8 on the slip 7 and next reads a 2-digit number out of the second password forming table 11 based on the print number 9 on the slip 7, and then enters a complete password of the 6-digit number on the password input device 2 of the on-line terminal unit 1.

In the on-line terminal unit 1, data of the data creation date and print number are fed to the password generator 4 at the time of issuance of the slip 7. The password generator 4 incorporates tables similar to the first password forming table 10 and second password forming table 11 in its internal memory, and it forms a 6-digit password from the entered data creation date and print number and sends the formed password to the password comparing processor 3. The password comparing processor 3 compares the 6-digit password provided by the password input device 2 with the 6-digit password provided by the password generator 4, and only when both passwords are coincident, it transmits data, which is the same as printed on the slip 7 and held in the transaction processor 6, to the destination on-line terminal unit.

Figure 3:
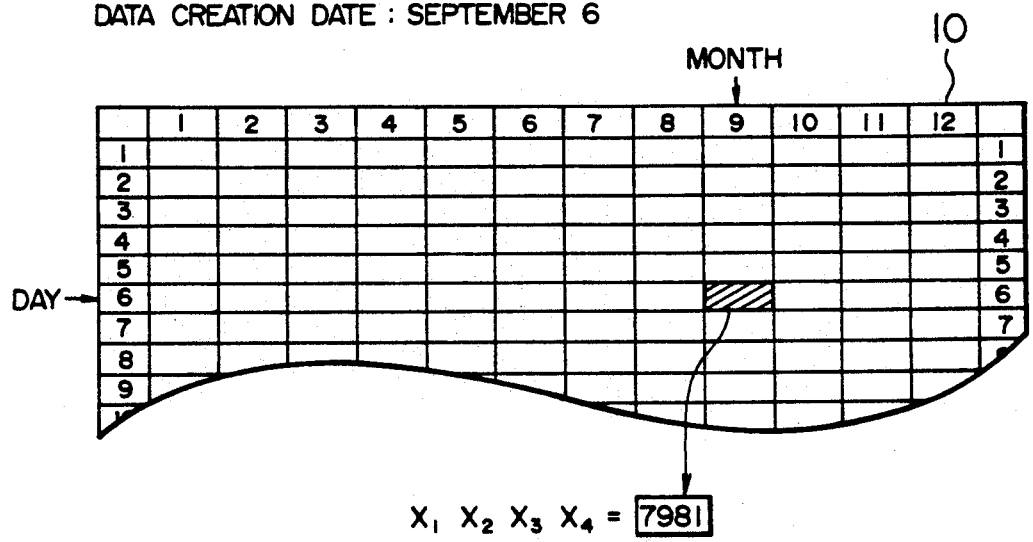
FIG. 3 is a diagram showing a first password forming table of this embodiment for forming the former part of a password based on the date of data creation.
Figure 4:
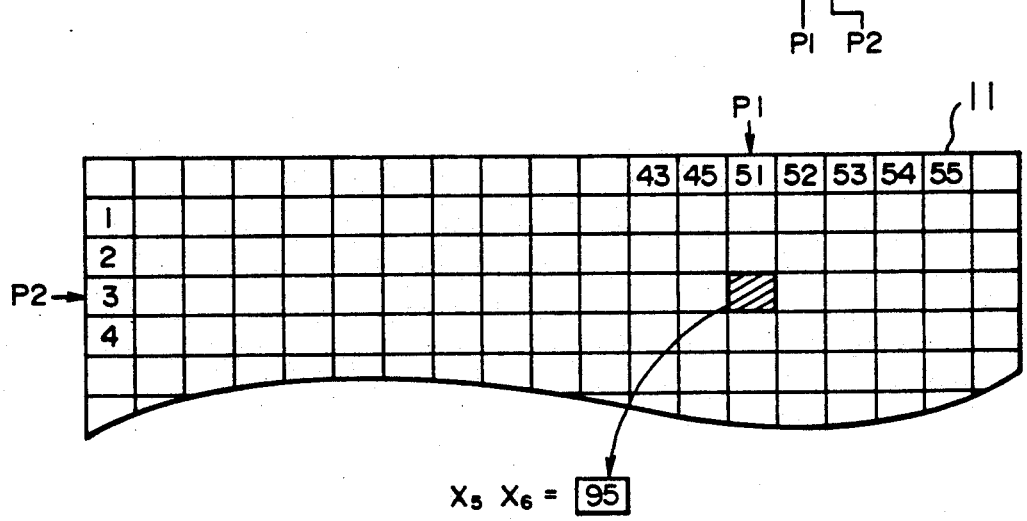
FIG. 4 is a diagram showing a second password forming table of this embodiment for forming the latter part of the password based on the print number.

FIG. 2 shows a specific example of the slip 7, FIG. 3 shows a specific example of the first password forming table 10, and FIG. 4 shows a specific example of the second password forming table 11. In forming a password in this example, with the data creation date and print number of the slip 7 being September 6 and No. 513, respectively, the user reads a number field of "7981" at the intersection of the month column "9" and the day row "6" and next reads a number field of "95" at the intersection of the column "51" and the row "3", and then forms a 6-digit password "798195".

According to the embodiment described above, in which the data creation date 8 and print number 9 printed on a slip 7 delivered by the on-line terminal unit 1 are used to form a 6-digit password through reference to the first password forming table 10 and second password forming table 11 at each access operation, the user does not need to remember a password, but simply remember the rule of password formation, whereby the user is free from risks of forgetting the password and of the leakage of the password to other person.

Although the foregoing embodiment deals with a password of a 6-digit number formed of the 4-digit data creation date and 2-digit print number, these numbers of digits can be chosen arbitrarily.

As will be appreciated from the above explanation, the inventive on-line terminal unit can be operated only by a specified person such as the manager of the firm who knows the rule of password formation without obliging the person to have risks of forgetting the preset password and leakage of password to other person, which are possible cases of the conventional scheme based on a secret number, with the active password being varied at random at each access operation on the terminal unit, whereby a tightly secure on-line terminal unit can be accomplished.

I claim:

1. An on-line terminal unit comprising:
means for automatically generating a first password of m+n digits formed of an m-digit number determined based on a date of data creation and an n-digit number determined based on a data print number;
means for entering a second password of m+n digits determined through reference to an external password table based on said date of data creation and said data print number; and means for comparing said first and second passwords and enabling data transmission only if both passwords coincide with each other.

2. An on-line terminal unit according to claim 1, wherein said m-digit number is determined through reference to a table of random numbers, said table of random numbers depending on said date of data creation.

3. An on-line terminal unit according to claim 1, wherein said n-digit number is determined through reference to a table of random numbers, said table of random numbers depending on said data print number.

4. A method of protecting data in an on-line terminal unit comprising:
outputting an output slip from said on-line terminal;
converting a date of data creation and a print number of the output slip to a first number using a table of random numbers by converting means in the on-line terminal;
converting the date of data creation and the print number of the output slip to a second number using a table of random numbers by a user;
inputting the second number to the on-line terminal as a password by the user;
comparing the first number with the second number; and
enabling the on-line terminal when both numbers coincide with each other.

5. An apparatus for protecting data in an on-line terminal unit comprising:
means for outputting an output slip from said on-line terminal;
means for converting a date of data creation and a print number of the output slip to a first number using a table of random numbers;
means for inputting a second number to the on-line terminal as a password by the user, where said second number is obtained by converting the date of data creation and the print number of the output slip to the second number by using a table of random numbers;
means for comparing the first number with the second number; and
means for enabling the on-line terminal when both numbers coincide with each other.

* * * * *